Patented Nov. 13, 1945

2,388,823

UNITED STATES PATENT OFFICE 2,388,823

METHOD OF PROCESSING BACON

Max Britt, Winfield, Ill., assignor to Industrial Patents Corporation, Chicago, Ill., a corporation of Delaware No Drawing. Application April 22, 1942, Serial No. 440,018

4 Claims. (Cl. 99—107)

This invention relates to the manufacture of bacon and has to do particularly with a method of treating pork bellies to produce a product of improved properties for the manufacture of bacon.

Bacon is usually prepared by processing pork bellies. The bellies are cut into slabs which may vary in size. The thickness of the slabs will vary depending on the carcass from which they are derived. Very thin bacon is not as desirable and is usually of less value than thicker prime quality bacon because of the thinness and unevenness of the slices resulting therefrom. Also the thicker bacon usually has a larger ratio of fat to lean whereby the bacon is more easily cooked.

An important object of the present invention is to improve the quality of thin bacon.

According to the present invention the bacon slabs are skinned, the skinned surfaces placed together back to back or fat to fat and the product subjected to temperature and pressure conditions whereby the skinned surfaces of a pair of slabs are bonded together. In this way the thickness of the thin bacon is increased and the slabs are formed into substantially one piece in which the thickness, the ratio of fat to lean, and the general quality of the bacon is substantially equal to that prepared from thick, prime quality pork bellies.

According to one embodiment of the invention, I may take the green or fresh pork bellies and cut them into slabs of any desired size before or after chilling to the temperatures of an ordinary cooling room, for example, about 32° to 36° F. The bellies or slabs are then skinned and the skinned surfaces of two slabs are placed together. One or more pairs of slabs are then pressed, preferably in forms made of metal or other material. The pressure to which the slabs are subjected depends on the number of slabs in the form and the thickness of the bellies. I have found that the application of about 90 pounds gage air pressure is satisfactory although this pressure may vary within quite a large range, for example 50 to 150 pounds. The temperature of the meat in the forms may vary considerably although I prefer to use about 36° to 40° F. Under such conditions of temperature and pressure the skinned fat sides of the bacon are substantially bonded together. The bonded slabs are then removed from the forms and subjected to a curing operation. The curing may take place in a chamber provided for this purpose and which may be maintained at temperatures of about 32° to 40° F., preferably about 36° to 38° F., and humidities of about 70 to 75 per cent. The product is allowed to cure under such conditions for about ten to thirty days. The curing may take place while the bacon is still in the forms in which case a longer period would be required than for merely shaping and bonding the slabs together. Also the curing may be produced by placing the bonded slabs in wire forms whereby they are subjected to a light pressure during the curing period. The cured product is next subjected to smoking in the usual manner. The smoking operation usually takes about twenty-four hours at a temperature of around 110° to 140° F., and a varying humidity depending on the condition of the product desired. The product is then ready for market.

According to another embodiment of the invention, the pork bellies or slabs thereof may be cured and smoked in the usual manner substantially as described above with the skins on. The resulting product is then chilled and the skin or rind removed. The slabs or pieces of the skinned, smoked bacon are matched as to size and the skinned surfaces of pairs placed back to back or fat to fat. One or more of the pairs of bacon are placed in a form under pressure as described above. It is often desirable to place a divider between each pair of bacon slabs in case several pairs are treated in the same form. The forms containing the bacon are then subjected to a temperature ranging from about 125° to 150° F. for about fifteen to twenty hours. Temperature treatment in the forms softens and kneads the fat surfaces causing the bellies to bind together thereby increasing the thickness thereof about double that of the single pieces and at the same time squaring the sides and ends. Instead of placing the bellies in the forms, they may be treated by hanging the pairs under pressure, for example in wire holders, although best results are obtained by treating in the molds under pressure as described above.

The product obtained by the present invention has many of the desirable qualities of a thicker, prime quality bacon. The product slices substantially the same as a single piece of thick bacon. It also has an unusual appearance, particularly as to the proportions of the fat and lean meat. By properly matching the slabs and by properly arranging the ends thereof, the uniformity of the fat and the lean meat may be increased throughout the entire piece of bacon.

Obviously many modifications and variations of the invention hereinbefore set forth may be made without departing from the spirit and scope thereof, and therefore, only such limitations should be imposed as are indicated in the appended claims.

I claim:

1. The method of treating pork bellies to produce an improved bacon product comprising chilling the bellies to a temperature below about 40° F., skinning the bellies, placing the skinned surfaces of the bellies together, pressing said skinned surfaces together at a pressure of from about 50 to 150 pounds per square inch, curing the bellies, and then raising the temperature to within the range of from about 110° F. to 150° F.

2. The method of treating pork bellies to produce an improved bacon product comprising chilling the bellies to a temperature below 40° F., skinning the bellies, placing the skinned surfaces of the bellies together, pressing said skinned surfaces together at a pressure of from 50 to 150 pounds per square inch, curing the bellies, continuing said pressing during curing of the bellies but at a greatly reduced degree, said curing being performed at a temperature of from 32 to 40° F. in an atmosphere of from 70 to 75 percent humidity and the curing conditions being continued for a period of from 10 to 30 days, and then raising the temperature to within the range of from about 110° F. to 150° F.

3. The method of treating pork bellies to produce an improved bacon product comprising chilling the bellies to a temperature below 40° F., skinning the bellies, placing the skinned surfaces of the bellies together, pressing said skinned surfaces together at a pressure of from 50 to 150 pounds per square inch, curing the bellies, and then simultaneously raising the temperature to within the range of from about 110° F. to 150° F. and smoking the bellies for a period of up to 24 hours.

4. The method of treating pork bellies to produce an improved bacon product comprising chilling the bellies to a temperature below 40° F., skinning the bellies, placing the skinned surfaces of the bellies together, pressing said skinned surfaces together at a pressure of from 50 to 150 pounds per square inch, curing and smoking the bellies, and raising the temperature of the pressed-together bellies to within the range of from about 110° F. to 150° F.

MAX BRITT.